(12) United States Patent
Matsui et al.

(10) Patent No.: US 7,793,998 B2
(45) Date of Patent: Sep. 14, 2010

(54) BUMPER FIXTURE, AND BUMPER MOUNTING STRUCTURE

(75) Inventors: Takeo Matsui, Hiroshima (JP); Kenji Ooki, Hiroshima (JP); Makoto Aizawa, Aki-gun (JP); Yuji Masaoka, Aki-gun (JP)

(73) Assignees: Nifco Inc., Yokohama-shi, Kanagawa (JP); Mazda Motor Corporation, Aki-gun, Hiroshima (JP)

( * ) Notice: Subject to any disclaimer, the term of this patent is extended or adjusted under 35 U.S.C. 154(b) by 855 days.

(21) Appl. No.: 11/590,837

(22) Filed: Nov. 1, 2006

(65) Prior Publication Data

US 2007/0096482 A1 May 3, 2007

(30) Foreign Application Priority Data

Nov. 2, 2005 (JP) .............................. 2005-319843

(51) Int. Cl.
*B60R 19/24* (2006.01)
(52) U.S. Cl. .................. 293/154; 293/155; 293/121
(58) Field of Classification Search ................ 293/121, 293/154, 120, 102, 155; 296/187.09, 187.11, 296/193.09, 193.08, 203.02, 203.04, 29
See application file for complete search history.

(56) References Cited

U.S. PATENT DOCUMENTS

| | | | | |
|---|---|---|---|---|
| 4,838,593 A | * | 6/1989 | Fleming et al. | 293/126 |
| 4,875,728 A | * | 10/1989 | Copp et al. | 293/126 |
| 4,895,405 A | * | 1/1990 | Sasatake et al. | 293/102 |
| 5,029,920 A | * | 7/1991 | Furuta et al. | 293/154 |
| 5,915,767 A | * | 6/1999 | Hosoda et al. | 293/126 |
| 6,003,933 A | * | 12/1999 | Rinklin | 296/198 |
| 6,010,169 A | * | 1/2000 | Cox et al. | 293/120 |
| 6,135,517 A | * | 10/2000 | Cordebar | 293/155 |
| 6,520,553 B2 | * | 2/2003 | Muramatsu | 293/155 |
| 6,769,727 B2 | * | 8/2004 | Delavalle et al. | 296/29 |
| 6,997,491 B2 | * | 2/2006 | Takahashi | 293/154 |
| 7,086,679 B2 | * | 8/2006 | Andre et al. | 296/29 |
| 7,540,550 B1 | * | 6/2009 | Huber et al. | 296/29 |

FOREIGN PATENT DOCUMENTS

| | | |
|---|---|---|
| DE | 197 36 755 | 2/1999 |
| DE | 101 43 607 | 4/2003 |
| EP | 1 619 082 | 1/2006 |
| FR | 2 857 314 | 1/2005 |
| JP | S63-128157 | 8/1988 |
| JP | 2003-191807 | 7/2003 |
| WO | WO 02/22403 | 3/2002 |

* cited by examiner

*Primary Examiner*—Glenn Dayoan
*Assistant Examiner*—Gregory Blankenship
(74) *Attorney, Agent, or Firm*—Manabu Kanesaka

(57) ABSTRACT

A bumper fixture is interposed between an extended-directional end portion of a bumper and an auto body as to extend the extended-directional end portion of the bumper mounted on the auto body to form a part of a wheel house. The bumper fixture includes a mounting portion mountable to an extended-directional outer end wall of the bumper on one extended-directional end portion of the bumper, and the mounting portion is elastically deformable by a greater than predetermined load. A bumper mounting structure includes the bumper fixture such that an extended directional outer end wall of the bumper is mounted on the mounting portion.

6 Claims, 9 Drawing Sheets

BUMPER FIXTURE, AND BUMPER MOUNTING STRUCTURE

BACKGROUND OF THE INVENTION AND RELATED ART STATEMENT

The present invention relates to a bumper fixture and a bumper mounting structure.

Japanese Patent Publication No. 2003-191807 discloses a bumper mounting structure for an automobile wherein the bumper is fixed to an auto body by mounting a bumper fixture (clip) on the auto body. More specifically, the bumper fixture is mounted on the longitudinal wall of an auto body depression and an upper side flange portion of a bumper is mounted on the bumper fixture. However, there is the case wherein the extended-directional end portion of the bumper comprises a part of a wheel house. In order to prevent the extended-directional end portion of the bumper from easily coming off the auto body, Japanese Utility Model Publication No. S63-128157 discloses a mounting hole formed on an upper surface of the auto body depression to which the bumper is attached, and using the mounting hole, the extended-directional end portion of the bumper is screwed shut on the auto body.

However, in a structure wherein the extended-directional end portion of the bumper is screwed shut on the auto body by using a mounting hole, when the bumper is expanded and contracted due to temperature changes, the structure cannot cope with the changes in size of the bumper in extended direction, with a result that a matching surface between the bumper and the auto body cannot be retained in one surface, and thereby adversely affecting the appearance of the bumper.

Another bumper mounting structure designed with rust prevention in mind includes a method wherein the matching surface between an auto body panel and another auto body panel is formed on the upper wall of the auto body depression. The bumper is attached, and the matching surface is sealed (i.e., an outer seal method) by a seal material. Since the seal material exists on the upper wall of the auto body depression wherein the bumper is attached, the mounting hole cannot be formed. As a result the end portion of the bumper cannot be solidly screwed shut on the auto body.

Accordingly, a first object of the invention is to provide a bumper fixture that can solidly mount an extended-directional end portion of a bumper on an auto body, regardless of the size changes of the bumper due to temperature changes.

Another object of the invention is to provide a bumper mounting structure using the bumper fixture.

Further objects and advantages of the invention will be apparent from the following description of the invention.

SUMMARY OF INVENTION

A first aspect of the present invention includes a bumper fixture interposed between an extended-directional end portion of a bumper and an auto body. The bumper fixture is interposed in such a way as to be extended in the extended direction of the bumper. The extended-directional end portion of the bumper is mounted on the auto body in such a way as to comprise a part of a wheel house. On one end of the extended-directional end portions, a mounting portion for mounting an extended-directional outer end wall of said bumper is formed. The mounting portion is configured so as to be elastically deformed by a load with more than a predetermined load. A preferred embodiment of this first aspect is the same as the following second and third aspects.

A fourth aspect includes a bumper mounting structure wherein the bumper fixture is interposed between the extended-directional end portion of the bumper and the auto body in such a way as to be extended in the extended direction of the bumper. In addition, the bumper fixture is configured to mount the extended-directional end portion of the bumper to the auto body in such a way as to comprise a part of the wheel house.

The mounting portion, which can be elastically deformed by the load with more than the predetermined load, is formed on one of the extended-directional ends of the bumper fixture. The extended-directional outer end wall of the bumper is mounted on the mounting portion. A preferred embodiment of this fourth aspect is the same as the following fifth and sixth aspects.

According to the invention described in the first aspect, the extended-directional outer end wall of the bumper may be mounted on the mounting portion of one of the extended-directional ends of the bumper fixture by using the bumper fixture which is mounted on the auto body. In addition, the extended-directional end portion of the bumper, which is used as a part of the wheel house, may be solidly mounted on the auto body.

On the other hand, since the mounting portion can be elastically deformed by the load with more than the predetermined load, even if the bumper is expanded and contracted according to temperature changes, the mounting portion is deformed and absorbs the expansion and contraction of the bumper, so that the mounting portion can cope with size changes of the bumper. Therefore, even if the bumper changes size in a longitudinal direction due to temperature changes, a matching surface between the bumper and the auto body can be retained in one surface, thereby maintaining the appearance of the bumper.

According to the second aspect, either a locked portion or a locking potion is provided on one side of the width direction of the bumper fixture in order to lock into another side of either the locked portion or the locking portion formed in one side of the width direction of the bumper. Either the locked portion or the locking portion may be set to slide, relative to in the extended direction of the bumper, in a locked state between either the locked portion or the locking portion, and another side of either the locked portion or the locking portion.

As a result, based on the locked portion and the locking portion, retention capacity (mounting strength) of the bumper relative to the auto body can be improved. At the same time, a stretching force of the bumper may be acted on the mounting portion without being controlled by the locked relationship between the locked portion and the locking portion. Furthermore, the internal contraction force can be let escape by an elastic deformation of the mounting portion. Consequently, while dependent upon size changes of the bumper due to temperature changes, the mounting strength of the bumper relative to the auto body may be improved.

According to the third aspect of the invention, because the mounting hole is formed in a risen plate portion that rises independently relative to other component portions, the extended-directional outer end wall of the bumper may be mounted on the bumper fixture using the mounting hole. Accordingly, the risen plate portion may be risen and lowered (elastic deformation) by the load with more than the predetermined load. As a result, the mounting portion of the bumper fixture may comprise a simple structure.

According to the fourth aspect of the invention, the mounting portion which can be elastically deformed by the load with more than the predetermined load is formed on one of the extended-directional ends of said bumper fixture, and the extended-directional outer end wall of said bumper is mounted on said mounting portion, so that the bumper fixture according to said first aspect can solidly mount the extended-directional end portion of the bumper on the auto body, and also cope with the size changes of the bumper according to the temperature changes.

According to the invention described in the fifth aspect, either the locked portion or the locking portion is provided on one side of the width direction of the bumper fixture, and another side of either the locked portion or the locking portion is provided on one side of the width direction of the bumper. The locked state between either the locked portion or locking portion and another side of either the locked portion or locking portion, is set to slide relatively in the extended direction of the bumper. As a result, the bumper fixture according to the second aspect can improve the mounting strength of the bumper relative to the auto body while coping with the size changes of the bumper due to the temperature changes.

The mounting portion of the bumper fixture in the sixth aspect comprises a mounting hole formed in the risen plate portion rising independently relative to other component parts of the bumper fixture. A mounting hole formed on the extended-directional outer end wall of the bumper corresponds to the bumper fixture mounting hole and a fastener is mounted on the mounting hole of the risen plate portion and on the mounting hole of the extended-directional outer end wall of the bumper. The risen plate portion of the bumper fixture and the extended-directional outer end wall of the bumper are integrated. Therefore, the bumper fixture according to the third aspect may allow the extended-directional end portion of the bumper to solidly mount to the auto body, notwithstanding any size changes of the bumper due to temperature changes.

DETAILED DESCRIPTION OF PREFERRED EMBODIMENTS

Hereinafter, preferred embodiments of the present invention will be explained with reference to the attached drawings.

Figure 1:
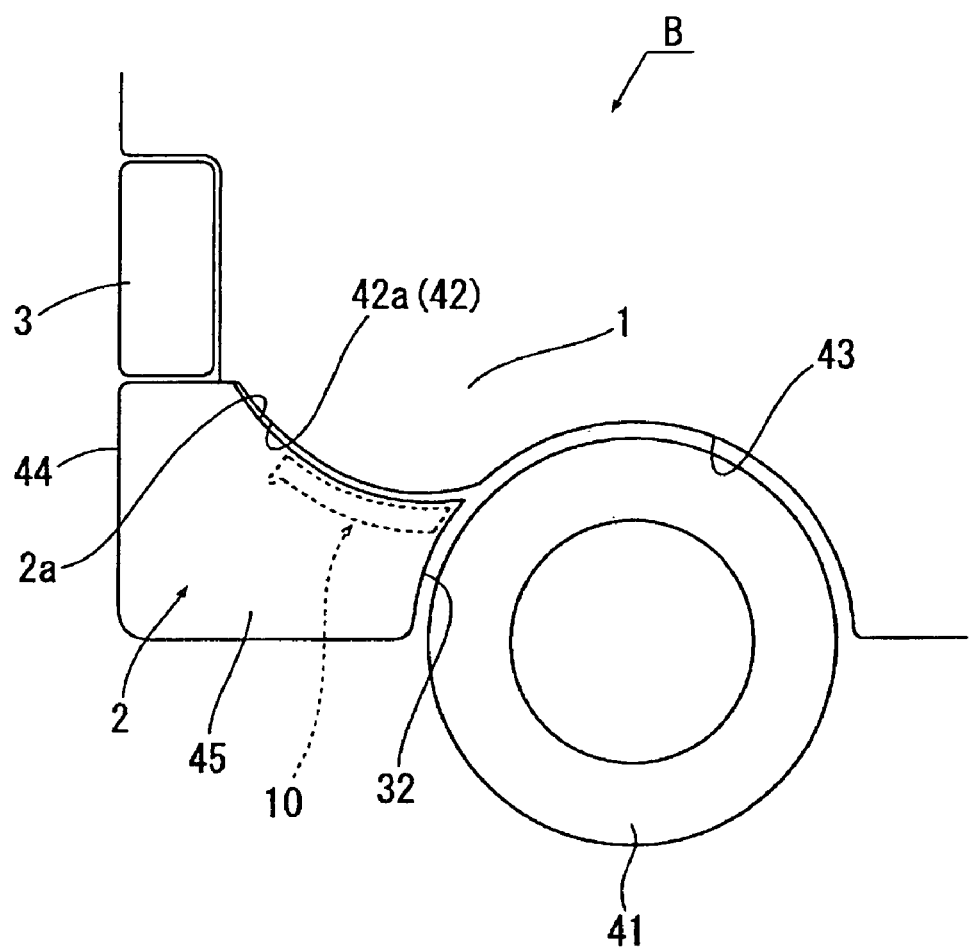
FIG. 1 is a side view of one embodiment of a clip used to mount a rear bumper of an automobile.

In FIG. 1, the reference alphabet B represents an auto body; a rear bumper 2 is provided on the lower portion of the back side of the auto body B; and a rear combination lamp 3 is provided on the upper side of the rear bumper 2.

Figure 2:
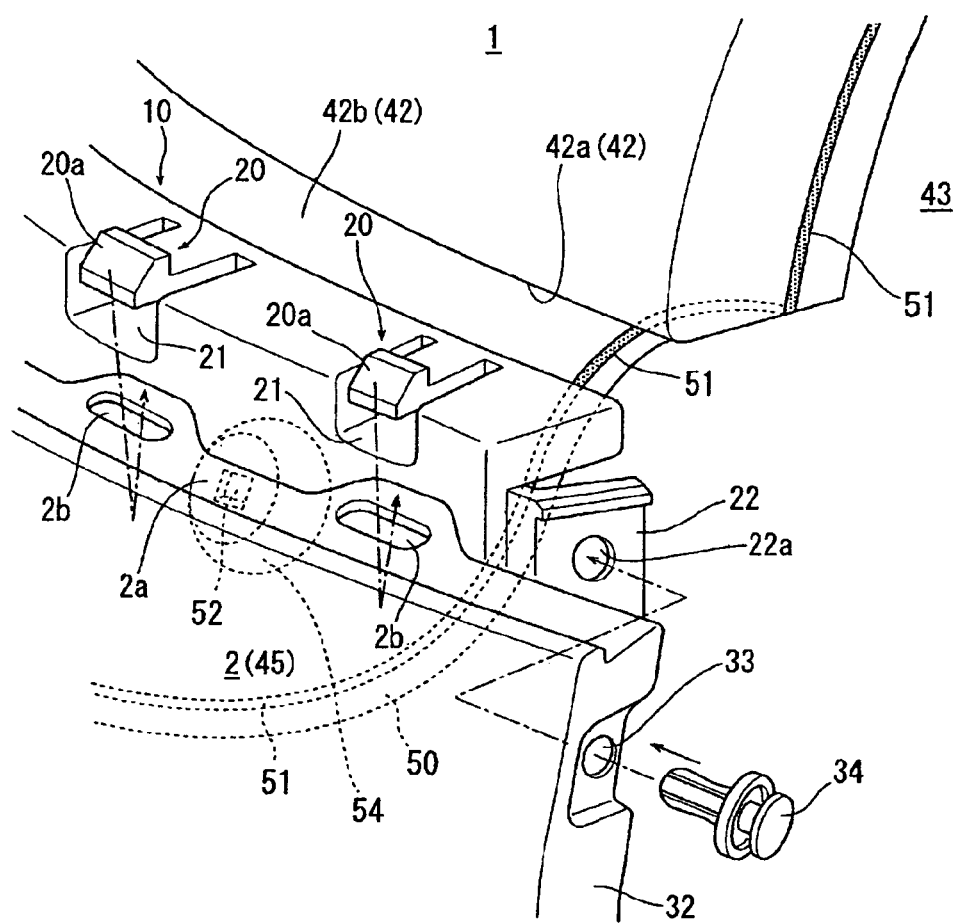
FIG. 2 is an exploded drawing of a rear bumper mounted on an auto body using the clip according to FIG. 1.

As shown in FIGS. 1 and 2, on both side walls 1 of said auto body B, a depression 42 depressed to the inner side of an auto width direction is formed in the back side of the auto body further than a back wheel 41. The depression 42 includes a depression upper wall 42a and a depression longitudinal wall 42b hanging from the depression upper wall 42a. The depression upper wall 42a becomes a projection toward the lower side and is curved in such a way as to gradually drop downward as the auto body moves forward (refer to FIG. 1). The inside of the depression 42 opens not only to the outside of the auto width direction but also to the front and back direction of the auto body B. The front side of the auto body of the depression 42 opens to the inside of a wheel house 43.

The depression upper wall 42a may be formed by matching and connecting a rear fender (equivalent to an auto body side wall 1) with an inner panel 50, and sealing (i.e., an outer seal method) a matched surface of the rear fender and the inner panel 50 by a seal material 51, for rust prevention.

As shown in FIG. 1, said rear bumper 2 includes a main portion 44 extending to the auto width direction. A folded portion 45 respectively extending to the front side of the auto body from both extended-directional end portions of the main portion 44 is provided. The main portion 44 of the rear bumper 2 is fixed to a bumper reinforcement (not shown in the figure), extending to an auto width direction in the back end portion of the auto body B.

A folded portion 45 of each rear bumper 2 on both right and left sides extends around the side wall of each back side from the back portion of the auto body B and enters into the depression 42. In this case, the upper end portion of the folded portion 45 of the rear bumper 2 is curved in such a way as to drop downward as the auto body moves forward in order to fit in the shape of the upper wall 42a of said depression 42. The extended-directional end of the rear bumper 2 (folded portion 45) is curved in such a way as to continue to the outer edge of the wheel house 43.

As shown in FIG. 2, the rear bumper 2 includes an upper wall 2a in the upper edge portion and an extended-directional outer end wall 32 is provided in the extended-directional end of the rear bumper 2 (folded portion). The upper wall 2a of the rear bumper 2 is formed in such a way as to project from the main body of the rear bumper 2, and the upper wall 2a is arranged in a state of being close to the depression upper wall 42a in the folded portion 45. On the upper wall 2a of the rear bumper 2, multiple mounting holes 2b (locked portions) are formed in the folded portion 45. The multiple mounting holes 2b are arranged in intervals in the extended direction (horizontal direction in FIG. 1) of the rear bumper 2 (folded portion 45). Each mounting hole 2b is a long hole extending in the extended direction of the rear bumper 2.

Also, the extended-directional outer end wall 32 of the rear bumper 2 is formed in such a way as to project from the main body of the rear bumper 2, and the extended-directional outer end wall 32 comprises a part (lower part) of the wheel house 43. A mounting hole 33 is formed on the extended-directional outer end wall 32 of the rear bumper 2, and the mounting hole 33 is arranged near the upper edge portion of the rear bumper 2.

Figure 3:
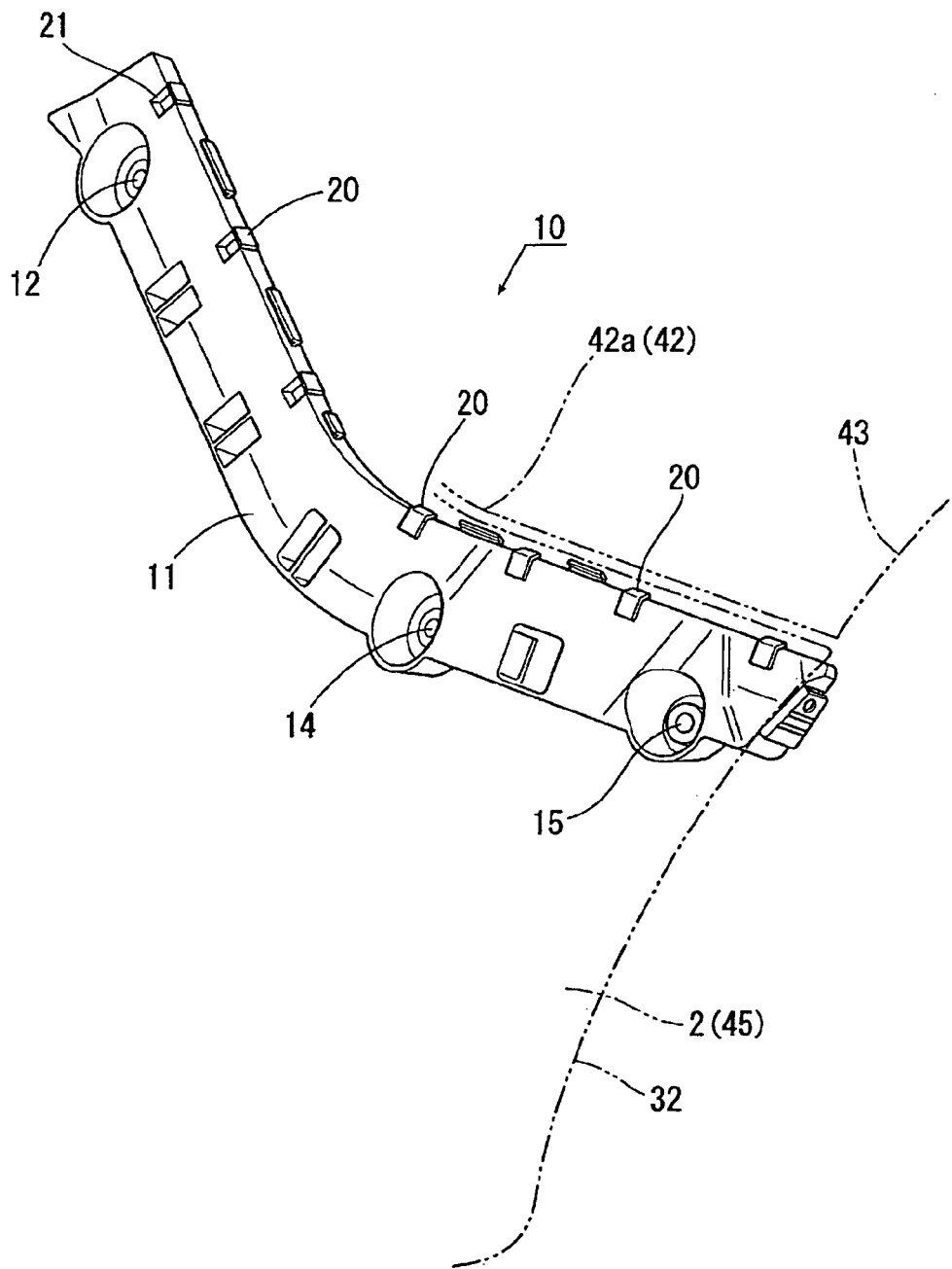
FIG. 3 is a perspective view of the clip according to FIG. 1.
Figure 4:
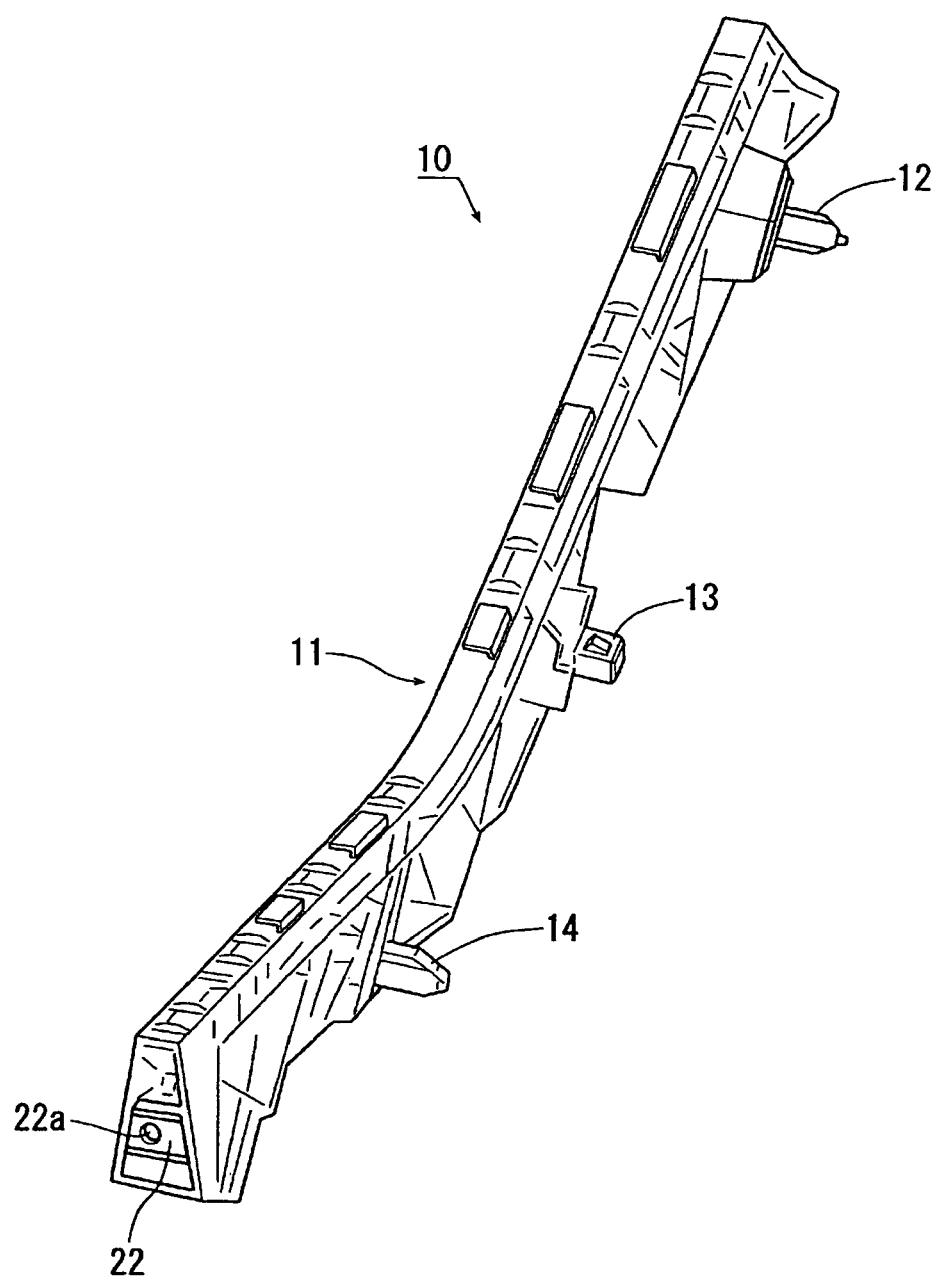
FIG. 4 is a drawing wherein the clip in FIG. 2 is viewed from an upper side of a back face.
Figure 5:
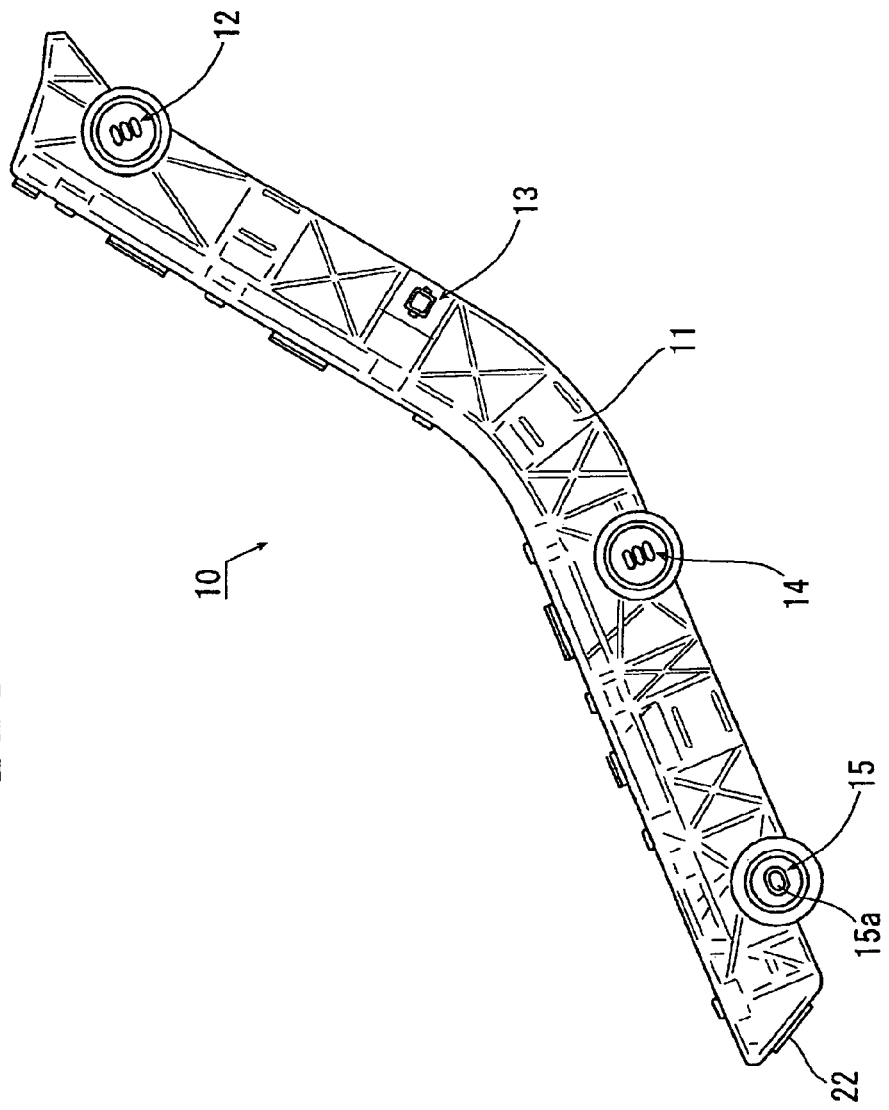
FIG. 5 is a drawing wherein the clip in FIG. 2 is viewed from the back face side.

As shown in FIGS. 1 and 2, a clip 10 is arranged as the bumper fixture between the depression longitudinal wall 42b and the rear bumper 2 (folded portion 45). As shown in FIGS. 3-5, the clip 10 is an integral molded part totally made of a hard synthetic resin, and includes a clip main body 11 and mounting portions 12-15 formed in the clip main body 11.

A belt-like structural member with nearly-constant width and nearly-constant thickness is used for the clip main body 11. One side of the thickness direction of the clip main body 11 is the back face side, and another side of the thickness direction of the clip main body 11 is the surface side. The back face side of the clip main body 11 faces the depression longitudinal wall 42b. In order to conform to the upper wall 42a of the folded portion 45 in the rear bumper 2, the clip main body 11 slopes in such a way that one of the extended-directional end sides becomes lower than another of the extended-directional end sides in a state wherein one of the extended-directional end sides (right side in FIG. 3, and left side in FIG. 5) faces the wheel house 43 side. Also, the clip main body 11 is somewhat curved in such a way as to be convex downward as a whole.

All of the mounting portions 12-15 are formed on the back face side (depression longitudinal wall 42b side) of the clip main body 11. The mounting portions 12-15 are arranged toward one of the extended-directional end sides from another of the extended-directional end sides of the clip main body 11 at intervals in order. In this embodiment, among the mounting portions 12-15, the mounting portions 12, 14 have the same structure.

Figure 6:
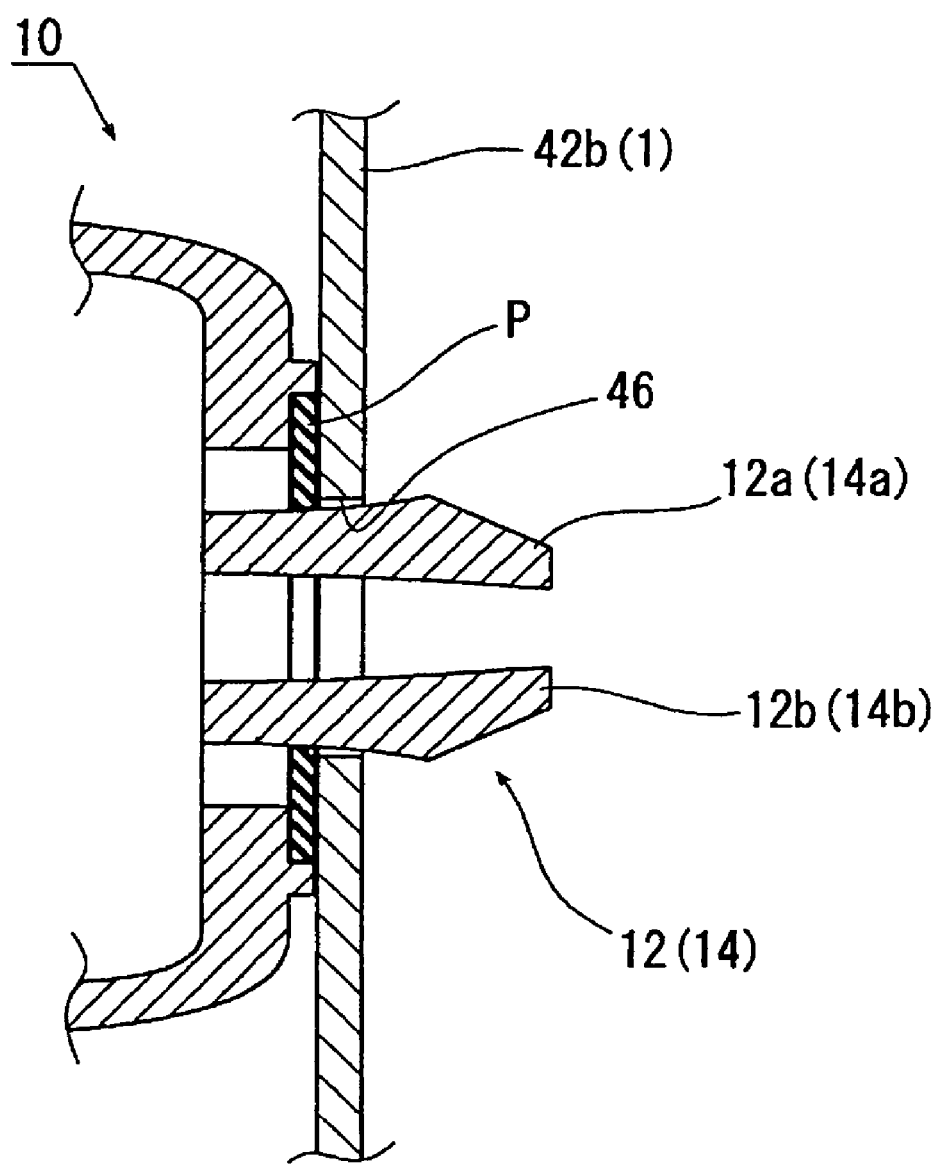
FIG. 6 is a cross sectional view of a mounting portion of the clip body, according to the clip of FIG. 1.
Figure 7:
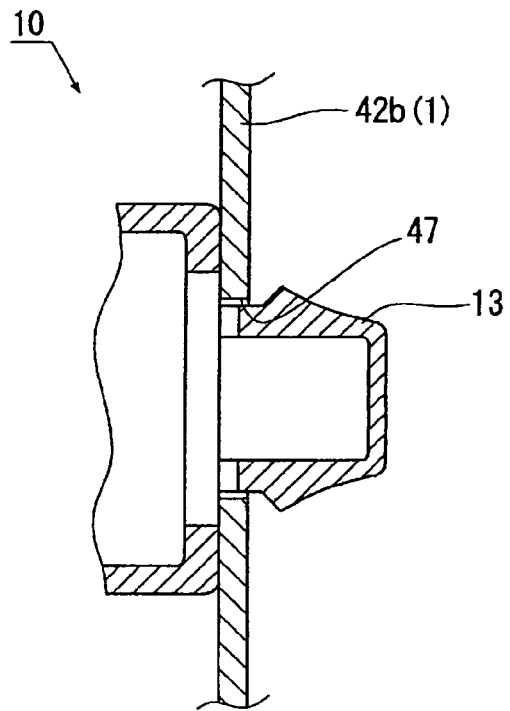
FIG. 7 is a cross sectional view of another mounting portion wherein the clip main body is mounted on the depression longitudinal wall (the side wall of the auto body)
Figure 9:
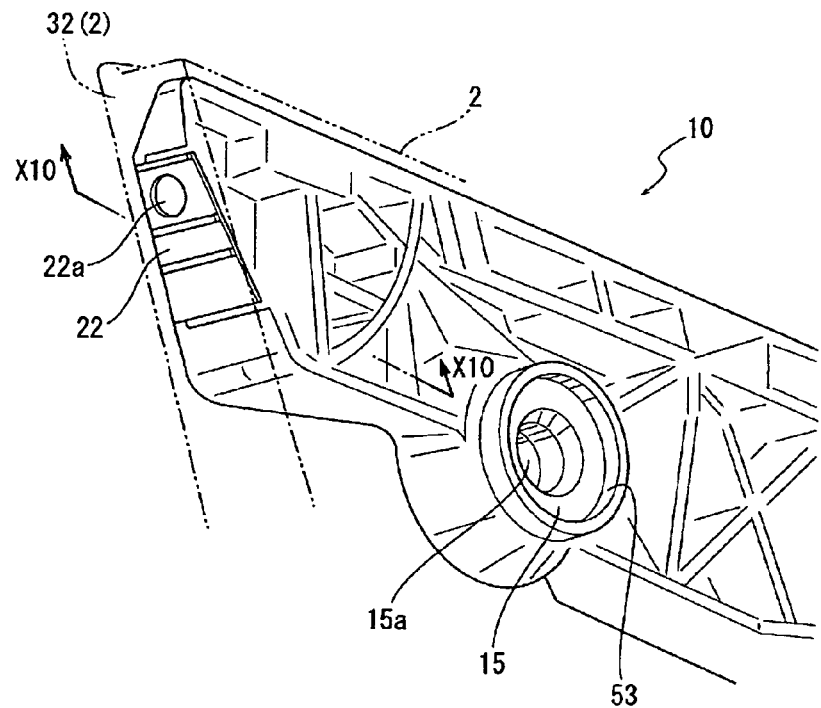
FIG. 9 is a perspective view showing one of the extended-directional end sides of the clip according to FIG. 1, from the back face side.
Figure 10:
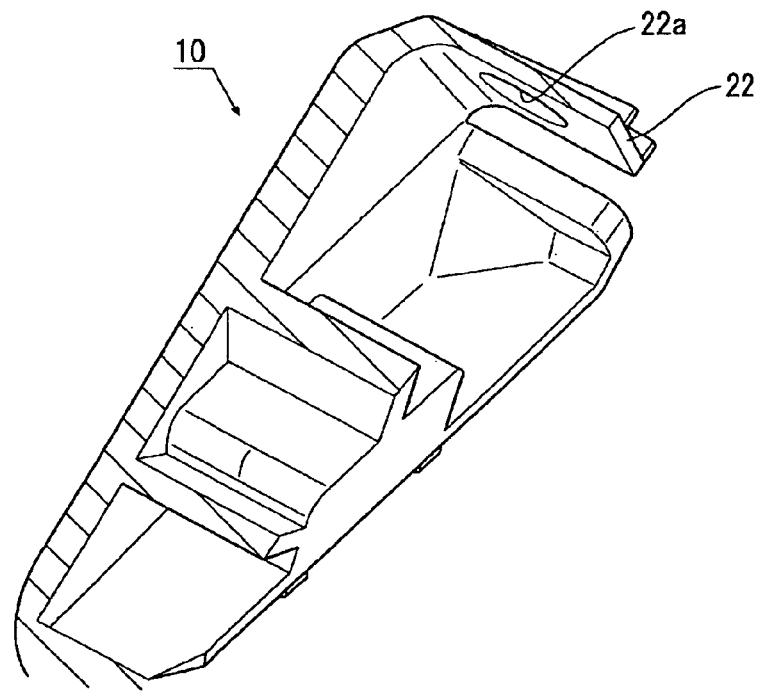
FIG. 10 is a sectional view taken along line X10-X10 in FIG. 9.
Figure 11:
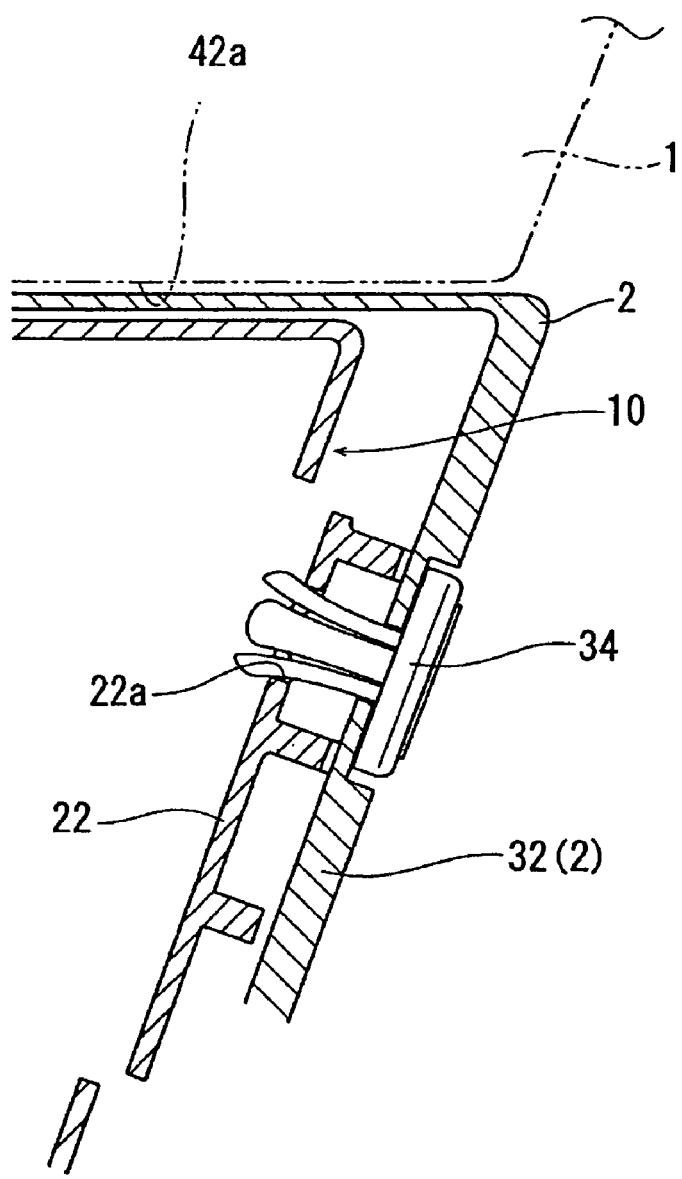
FIG. 11 is a longitudinal sectional view showing a state wherein an extended-directional outer end wall of the rear bumper and one of the extended-directional end sides of the clip are connected.

As shown in FIG. 6, the mounting portion 12(14) is constituted by locking claws 12a, 12b (14a, 14b) that are substantively halved. The two locking claws 12a, 12b (14a, 14b) are formed in such a way as to comprise an enlarged head portion being able to substantively expand and contract by using the elastic deformation between the tips. The locking claws 12a, 12b (14a, 14b) are retained by being inserted (pressed) into a mounting hole 46 formed in the depression longitudinal wall 42b. Incidentally, in FIG. 6, the reference letter P represents a packing. As shown in FIG. 7, the mounting portion 13 is formed in such a way as to comprise the enlarged head portion as a whole, and retained by being inserted (pressed) into a mounting hole 47 formed in the depression longitudinal wall 42b using elastic deformation in the radial direction. As shown in FIGS. 3, 5, 9, the mounting portion 15 is formed by a fastener mounting hole 15a. By using the mounting hole 15a, a mounting hole 52 (refer to FIG. 2) formed in the depression longitudinal wall 42b corresponds to the mounting hole 15a. A fastener (not shown in the figures) is forced into the mounting hole 15a and the mounting hole 52. One end portion of the clip main body 11 is fixed into the depression longitudinal wall 42b. In this case, as shown in FIG. 9, a fitting wall 53 is formed around the mounting hole 15a in the back face side of the clip main body 11.

As shown in FIG. 2, the mounting hole 52 is formed on the tip of a bulge portion 54 provided in the depression longitudinal wall 42b. When the mounting holes 15a and 52 overlap, the bulge portion 54 is fitted into the fitting wall 53. Because each mounting portion 12-15 is formed as in the case of a conventional mounting portion, further explanation is omitted.

As shown in FIGS. 2 and 3, multiple (seven in this embodiment) locking pieces 20 (locking portions) are provided in the upper side of the clip main body 11, corresponding to the mounting holes 2b of the upper wall 2a in the folded portion 45. Grooves 21 are respectively formed in the clip main body 11 (upper side portion) corresponding to each locking piece 20, and locking piece 20 is respectively provided inside each groove 21. The base end portion of each locking piece 20 is connected to the back face side portion of the clip main body 11, and the tip side is in a cantilevered state. In addition, the tip side may be bent as a supporting point of the base end portion. A locking claw 20a is provided on the tip portion of each locking piece 20 in such a way as to project upward more than the upper side portion of the clip main body 11.

Figure 8:
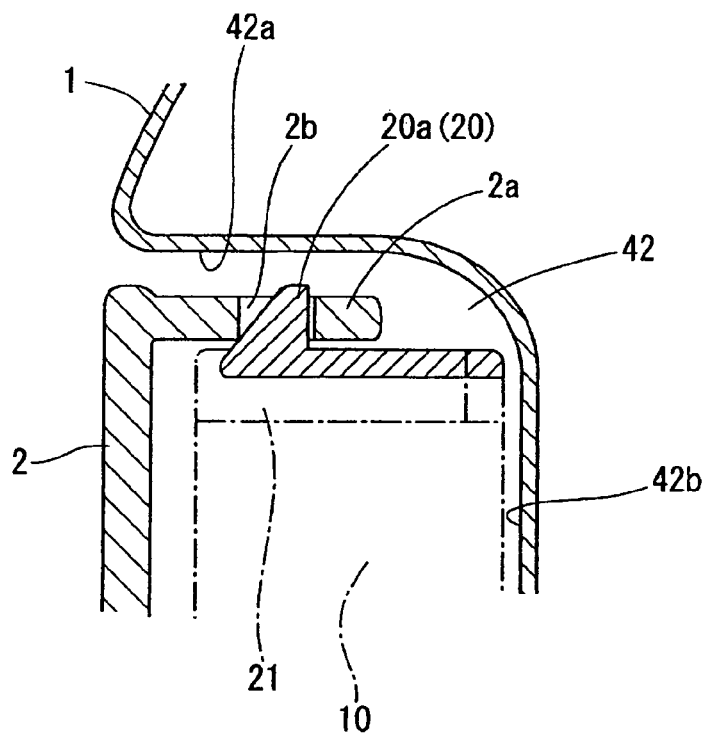
FIG. 8 is a cross sectional view illustrating a rear bumper mounted on the depression longitudinal wall (the side wall of the auto body) by a locking piece.

As shown in FIG. 8, the locking claw 20a of each locking piece 20 is locked into each mounting hole 2b of the upper wall 2a in the folded portion 45. The locking claw 20a is locked into the mounting hole 2b by using bendable locking piece 20 and sliding the upper wall 2a of the rear bumper 2 to the depression longitudinal wall 42b side on the upper side portion of the clip main body 11. In this case, the width of the locking piece 20 (locking claw 20a) is somewhat shorter than the length of longitudinal direction of the mounting hole 2b (long hole). Even if the locking claw 20a and the mounting hole 2b are locked, the rear bumper 2 can be slightly displaced (slid) in the extended direction (front-to-back direction of the auto body) of the folded portion 45.

Incidentally, each locking piece 20 including the mounting portions 12-15, may be integrally molded with the clip main body 10 by hard synthetic resin.

As shown in FIGS. 2 and 9-11, in one of the extended-directional end portions, the clip main body 11 includes a risen plate portion 22 and a mounting hole 22a formed in the risen plate portion 22, and together form a mounting portion relative to the extended-directional outer end wall 32 (mounting hole 33) in the rear bumper 1. The risen plate portion 22 is located in a position slightly projecting outside compared to the other peripheral wall portion while combining a part of the peripheral wall of the clip main body 11. A slit-like gap is formed between the risen plate portion 22 and the other peripheral wall portion, and the risen plate portion 22 rises in an independent state relative to the other peripheral wall portion. While the risen plate portion 22 maintains the usual risen position up to a nearly predetermined load by the rising strength, the risen plate portion 22, as the supporting point of a surface side portion of the clip main body 11, is set to elastically bend (rise and lower) when a load, e.g., expansion and contraction due to temperature changes of the rear bumper 2, acts with more than a predetermined load.

In some embodiments, the risen plate portion 22 may be set to permit bending up to approximately 1 cm in the position of the mounting hole 22a. On the other hand, the mounting hole 22a is positioned corresponding to the mounting hole 33 of the extended-directional outer end wall 32 of the rear bumper 2 in one of the extended-directional end portions of the clip main body 11. By pressing a fastener 34 into both mounting holes 22a and 33, the extended-directional outer end wall 32 of the rear bumper 2 is mounted on the risen plate portion 22.

As mentioned above, when the extended-directional end portion of the rear bumper 2 is mounted on a rear fender 1 by using the clip 10, the clip 10 is solidly mounted on the depression longitudinal wall 42b by the mounting portions 12-15. At the same time, the locking pieces 20 (locking claw 20a) of the clip 10 are locked into the mounting hole 2b of the upper wall 2a of the rear bumper 2. Moreover, the extended-directional outer end wall 32 of the rear bumper 2 is mounted on one of the extended-directional end portions (risen plate portion 22) of the clip 10 using the fastener 34.

Accordingly, without forming the mounting hole in the depression upper wall 42a and screwing shut the end portion of the rear bumper 2, the extended-directional end portion (especially, a portion near the extended-directional end among the folded portion 45) of the rear bumper 2 comprising a part of the wheel house 43 may be solidly fixed into the auto body through the clip 10.

Even if the rear bumper 2 is expanded and contracted in the extended direction due to the temperature changes, the risen plate portion 22 is bent by just expanded and contracted amounts. Consequently, because the matching surface between the rear bumper 2 and the auto body is retained in one surface, deterioration of the appearance may be prevented. Moreover, because the width of each locking piece 20 (locking claw 20a) is slightly shorter than the length of the longitudinal direction of each mounting hole 2b, the locked relationship between the locking piece 20 and the locking hole 2b never controls the expansion and contraction of the rear bumper 2 due to temperature changes.

Although the embodiment was explained above, the present invention includes the following embodiment.

(1) The clip 10 may be applied not only to the rear bumper 2, but also to a front bumper.

(2) The depression upper wall 42a is not limited to a wall sealed by matching an auto body panel with another auto body panel.

The purpose of the present invention is not limited to the above-mentioned embodiment, but also implicitly includes an embodiment which is expressed as a substantively preferred or advantageous embodiment.

The disclosure of Japanese Patent Application No. 2005-319843 filed on Nov. 2, 2005 is incorporated by reference in its entirety.

While the invention has been explained with reference to the specific embodiments of the invention, the explanation is illustrative and the invention is limited only by the appended claims.

What is claimed is:

1. A bumper fixture interposed between a bumper and an auto body, said bumper fixture comprising:
    an elongated main body to be fixed to the auto body, said main body having lateral ends, and
    at least one mounting portion configured to mount a side end wall of the bumper, said at least one mounting portion having a fixture mounting hole therein and being integrally fixed to one of the lateral ends only at one side thereof so that said at least one mounting portion is elastically deformable by a force greater than a predetermined load, and
    wherein said mounting portion is fixed to said one side of the lateral end of the main body to incline thereto, thereby forming a gap at the other end thereof.

2. A bumper fixture according to claim 1, further comprising one of a locked portion and a locking portion provided on one side in a width direction of the bumper fixture so as to lock with one of a locked portion and a locking portion formed on one side in a width direction of the bumper, wherein one of the locked portion and locking portion of the bumper fixture is set to slide relatively to the bumper, in a longitudinal direction of the bumper, in a locked state therebetween.

3. A bumper fixture according to claim 1, wherein the mounting portion is located in a position partially projecting outside a peripheral wall portion of the lateral end, and defined by a gap with respect to said peripheral wall portion.

4. A bumper mounting structure, comprising:
    a bumper, and
    the bumper fixture according to claim 1, wherein the bumper fixture is arranged to mount the side end walls of the bumper to the auto body such that each of the side end walls of the bumper forms a part of a wheel house.

5. A bumper mounting structure according to claim 4, wherein said bumper fixture further comprises one of a locked portion and a locking portion provided on one side of a width direction of the bumper fixture, and said bumper comprises one of a locking portion and a locked portion in a width direction thereof to lock with said one of the locked portion and the locking portion of the bumper fixture, said one of the locked portion and locking portion of the bumper fixture being set to slide relatively to the bumper, in an elongated direction of the bumper, in a locked state therebetween.

6. A bumper mounting structure comprising:
    a bumper, and
    a bumper fixture interposed between the bumper and an auto body, the bumper fixture comprising:
    an elongated main body to be fixed to the auto body, said main body having lateral ends, and
    at least one mounting portion configured to mount a side end wall of the bumper, said at least one mounting portion having a fixture mounting hole therein and being integrally fixed to one of the lateral ends only at one side thereof so that said at least one mounting portion is elastically deformable by a force greater than a predetermined load,
    wherein the bumper fixture is arranged to mount the side end walls of the bumper to the auto body such that each of the side end walls of the bumper forms a part of a wheel house, and
    wherein the bumper includes a bumper mounting hole formed in the side end wall thereof; and a fastener is mounted between the fixture mounting hole and the bumper mounting hole such that the mounting portion and the side end wall of the bumper are integrated.

* * * * *